No. 868,947. PATENTED OCT. 22, 1907.
E. S. STIMPSON.
FILLING DETECTING MECHANISM FOR LOOMS.
APPLICATION FILED MAY 29, 1907.
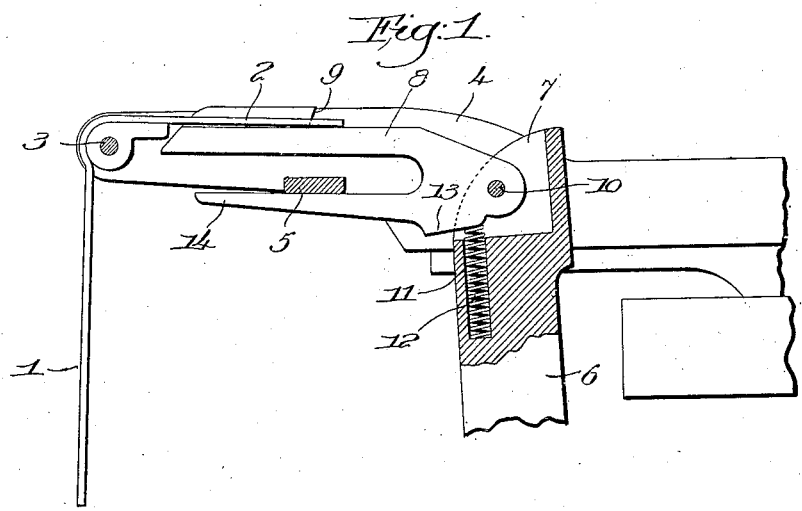
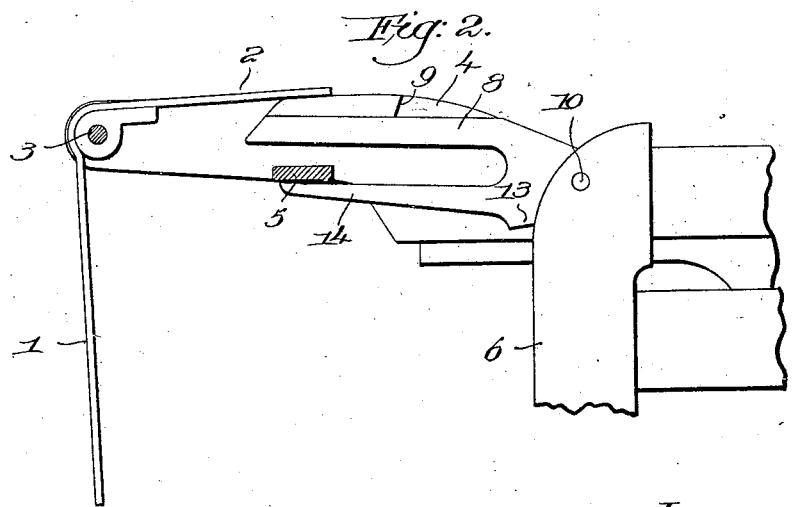

UNITED STATES PATENT OFFICE.

EDWARD S. STIMPSON, OF HOPEDALE, MASSACHUSETTS, ASSIGNOR TO DRAPER COMPANY, OF HOPEDALE, MASSACHUSETTS, A CORPORATION OF MAINE.

FILLING-DETECTING MECHANISM FOR LOOMS.

No. 868,947.      Specification of Letters Patent.      Patented Oct. 22, 1907.

Application filed May 29, 1907. Serial No. 376,364.

*To all whom it may concern:*

Be it known that I, EDWARD S. STIMPSON, a citizen of the United States, and a resident of Hopedale, county of Worcester, State of Massachusetts, have invented an Improvement in Filling-Detecting Mechanism for Looms, of which the following description, in connection with the accompanying drawings, is a specification, like letters on the drawing representing like parts.

This invention has for its object the production of novel filling-detecting mechanism for looms, whereby the rebounding tendency of the fork, after it has been tilted, is overcome.

The engagement of the filling with the fork often throws the fork-tail upward with considerable violence, and upon its descent the tail drops upon the shouldered hook connected with the vibrator or weft-hammer, and as the latter is ordinarily slidably sustained by a lug or cross-bar on the fork-slide the contact of the tail with the unyielding hook causes the fork to rebound. Such rebound is objectionable in the practical operation of the loom, as it interferes with the proper action of the fork.

Various devices have been provided to diminish or overcome the rebounding tendency, but so far as I am aware no attempt has been made to overcome the rebounding tendency by cushioning the fork after it has been tilted, as in my present invention.

The various novel features of my invention will be fully described in the subjoined specification and particularly pointed out in the following claims.

Figure 1 is a longitudinal sectional view, taken between the sides of the fork-slide, of filling-detecting mechanism embodying one form of my invention, the head of the vibrator or weft-hammer being shown in section; Fig. 2 is a similar view, but showing the manner in which the fork is cushioned upon its return to normal position after it has been tilted, the vibrator being then on its forward stroke.

Referring to the drawings a filling-fork having tines 1 and a tail 2 is shown as fulcrumed at 3 between the sides of a support or slide 4 of usual construction, and provided with a cross-bar 5, the upper end or head of the vibrator or weft-hammer 6 moving back and forth between the sides of the slide, all in usual manner. The vibrator head is recessed at 7, Fig. 1, and receives therein the forward end of the hook 8, shouldered at 9 to coöperate with the fork-tail when the fork detects filling failure, the hook being shown as pivotally connected at 10 with the vibrator. Ordinarily the hook slides back and forth upon a lug or cross-bar, such as 5, carried by the fork-slide, so that the hook presents an entirely unyielding surface when the fork-tail descends upon it after the fork has been tilted by the filling.

In my present invention I still make use of the cross-bar 5 as a guide for the hook, but I yieldingly support said hook.

In the embodiment of my invention herein illustrated I form a pocket or socket 11 in the head of the vibrator 6 back of the hook pivot 10, and under said hook, and in this socket is inserted a spiral spring 12, Fig. 1, the free upper end of the spring bearing against a flattened portion 13 on the underside of the hook, and as shown in Fig. 1 quite near its pivot. The hook has a rearward extension or finger 14 which projects beneath the cross-bar 5, and normally said finger is upheld by the stress of the spring in sliding contact with the cross-bar, the latter serving to guide the hook in its forward and backward movements, and acting with the spring to maintain the hook in proper position. The spring is of sufficient force to just about balance the hook when the fork-tail rests thereupon, and to maintain the finger 14 against the underside of the cross-bar 5, as shown in Fig. 1. Now, after the fork has been tilted its tail 2 descends and hits the hook 8 back of the shoulder, see Fig. 2, the vibrator then moving forward, and the impact of the blow slightly depresses the hook against the spring, which yields and thereby cushions the fork-tail as it drops onto the hook, and then the spring returns the hook to normal position. Such cushioning of the fork-tail overcomes any tendency to rebound, as the spring takes up or absorbs the blow of the fork-tail on the hook.

In Fig. 2 I have shown in an exaggerated degree the yielding of the hook when the fork-tail drops thereupon. With the structure herein shown the fork may be heavy or light, as desired, or required by the character of the fabric being woven, for whatever the weight of the fork the cushioning action will take place when the tail descends after tilting of the fork.

My invention is not restricted to the precise construction and arrangement herein shown and described, as the same may be varied or modified in different particulars without departing from the spirit and scope of my invention.

Having fully described my invention, what I claim as new and desire to secure by Letters Patent is:—

1. In filling-detecting mechanism for looms, in combination, a filling-fork adapted to be intermittingly engaged and tilted by the filling when intact, a vibrator having a hook to coöperate with the fork upon detection thereby of filling failure, and means to yieldingly sustain the hook in its operative position.

2. The combination, with a filling-fork adapted to be tilted by intact filling, and a slide on which the fork is pivotally mounted, said slide having a cross-bar, of a weft-hammer, a hook movably mounted thereon and having a finger extended beneath said cross-bar, and a spring to yieldingly maintain the finger against the cross-bar with the hook in position to coöperate with the fork upon detection thereby of filling failure.

3. In filling-detecting mechanism for looms, a movable support, a filling-fork fulcrumed thereon and provided with a tail, a vibrating member to coöperate with the fork tail and thereby move the support upon detection of filling failure, and means to yieldingly sustain the vibrating member, whereby the descent of the fork-tail thereon is cushioned.

4. In filling-detecting mechanism for looms, in combination, a filling-fork adapted to be intermittingly engaged and tilted by the filling when intact, and yielding means to cushion the fork upon return movement thereof after it has been tilted, to prevent rebound of the fork.

5. In filling-detecting mechanism for looms, in combination, a filling-fork adapted to be intermittingly engaged and tilted by the filling when intact, a vibrator having a shouldered hook to coöperate with the fork-tail upon detection of filling failure, and a spring to sustain the hook and permit the same to yield upon impact of the descending tail after the fork has been tilted.

In testimony whereof, I have signed my name to this specification, in the presence of two subscribing witnesses.

EDWARD S. STIMPSON.

Witnesses:
 EUGENE BEAUDRY,
 CLARE HILL DRAPER.